US009992651B2

(12) United States Patent
Hong et al.

(10) Patent No.: US 9,992,651 B2
(45) Date of Patent: *Jun. 5, 2018

(54) SYSTEM AND METHOD FOR SHARING MESSAGE/CONTENT USING LOCATION INFORMATION

(71) Applicant: Samsung Electronics Co., Ltd., Suwon-si (KR)

(72) Inventors: Dohy Hong, Seoul (KR); Kyungwhoon Cheun, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/699,601

(22) Filed: Sep. 8, 2017

(65) Prior Publication Data

US 2018/0014170 A1   Jan. 11, 2018

Related U.S. Application Data

(63) Continuation of application No. 14/821,466, filed on Aug. 7, 2015, now Pat. No. 9,763,069.

(30) Foreign Application Priority Data

Aug. 8, 2014   (KR) .................. 10-2014-0102113

(51) Int. Cl.
*H04L 12/58* (2006.01)
*H04M 1/725* (2006.01)
(Continued)

(52) U.S. Cl.
CPC .......... *H04W 4/206* (2013.01); *H04W 4/023* (2013.01)

(58) Field of Classification Search
None
See application file for complete search history.

(56) References Cited

U.S. PATENT DOCUMENTS 9,763,069 B2   9/2017   Hong et al.
2006/0155723 A1   7/2006   Kumar
(Continued)

FOREIGN PATENT DOCUMENTS

EP   2681666 A1   1/2014
EP   2684038 A2   1/2014
WO   2011-051845 A2   5/2011

*Primary Examiner* — Martin Mushambo
(74) *Attorney, Agent, or Firm* — McAndrews, Held & Malloy, Ltd.

(57) ABSTRACT

A system and method for sharing a message and/or content using location information. The system for sharing a message and/or content includes at least one upload terminal that generates and transmits post metadata including a message/content prepared for uploading, location of the upload terminal, and location for uploading the prepared message/content thereto; a download terminal that transmits a connection message including current location, and downloads message/content posted within a predetermined distance from the current location to display the posted message/content; and a server that verifies the post metadata by receiving the prepared message/content and the post metadata corresponding to the prepared message/content from the upload terminal, stores a result of verification, searches for the prepared message/content to be provided to the download terminal when the connection message including the location is received from the download terminal, and provides information on the searched message/content and post location to the download terminal.

20 Claims, 12 Drawing Sheets

(51) Int. Cl.
*H04W 4/20* (2018.01)
*H04W 4/02* (2018.01)

(56) References Cited

U.S. PATENT DOCUMENTS

| | | |
|---|---|---|
| 2007/0249368 A1* | 10/2007 | Bailly ............... G06F 17/30241 455/457 |
| 2009/0163196 A1* | 6/2009 | Van Steenbergen ..... H04M 1/72541 455/422.1 |
| 2011/0083101 A1 | 4/2011 | Sharon |
| 2014/0024354 A1 | 1/2014 | Haik |
| 2014/0059652 A1* | 2/2014 | Choi ................... H04L 63/123 726/4 |

* cited by examiner

SYSTEM AND METHOD FOR SHARING MESSAGE/CONTENT USING LOCATION INFORMATION

RELATED APPLICATION

This application is a continuation of U.S. patent application Ser. No. 14/821,466, filed on Aug. 7, 2015, expected to issue as U.S. Pat. No. 9,763,069 on Sep. 12, 2017, which claims the benefit under 35 U.S.C. § 119(a) of a Korean patent application filed on Aug. 8, 2014, in the Korean Intellectual Property Office and assigned Serial No. 10-2014-0102113, each of which is hereby incorporated herein by reference in its entirety.

BACKGROUND

The present disclosure relates to a system and method for sharing a message and/or content, and more particularly to a system and method for sharing a message and/or content using location information.

Recently, a social network service that has widely been used in society is a service system that provides a human network for strengthening personal relationships with already known persons and forming new personal relationships with other unknown persons on the Internet that is called web. In the beginning of such a social network service, it was mainly used for the purpose of enhancement of mutual friendship and entertainment. However, there is growing tendency that the social network service is used for productive purposes, such as business and sharing of various kinds of information. Further, utilization of latest information has been increased through various types of searches using the social network service in a specific keyword search through a portal site.

With the successive appearance of various types of ideas using such a social network service, new services based on the social network service have been proposed.

However, in the case of using not only a portal service but also a social network service, it is not easy to search for matters in which a user may be interested around the user on the basis of the current user's location.

SUMMARY

The present disclosure has been made in an effort to solve the above problem and it is an object of the present disclosure to provide a method for controlling a social network service network and constituent elements thereof, which can provide a service based on user's location.

In accordance with an aspect of the present disclosure, a system for sharing a message/content using location information includes at least one upload terminal that generates and transmits post metadata including a message/content prepared for uploading, location information of the upload terminal, and location information for uploading the prepared message/content thereto; at least one download terminal that transmits a connection message including current location information, and downloads the message/content posted within a predetermined distance from the current location to display the posted message/content; and a server that verifies the post metadata by receiving the prepared message/content and the post metadata corresponding to the prepared message/content from the upload terminal, additionally stores the result of verification in a database, searches for the prepared message/content to be provided to the download terminal when the connection message including the location information is received from the download terminal, and provides information on the searched message/content and post location information to the download terminal.

In accordance with another aspect of the present disclosure, a method for sharing a message/content in a system for sharing the message/content including an upload terminal that prepares and uploads the message/content to a server and a download terminal that receives the message/content stored in the server, includes the upload terminal generating post metadata including the message/content prepared for uploading, location information of the upload terminal, and location information for uploading the prepared message/content thereto and transmitting the generated post metadata to the server; the server receiving the prepared message/content and the post metadata corresponding to the prepared message/content from the upload terminal; the server verifying the post metadata, and storing the verified post metadata and the prepared message/content in a data base; the download terminal transmitting a connection message including current location information; the server searching for the prepared message/content to be provided to the download terminal when the connection message is received, and providing information on the searched message/content and post location information to the download terminal; and the download terminal downloading the message/content posted within a predetermined distance from the current location, and displaying the posted message/content.

According to the system and method according to the present disclosure, various types of messages and/or content can be provided to various downloaders in a specific destination that is desired by a user, and the downloaders can be provided with desired messages and/or content based on their locations. Further, through application of the present disclosure, it becomes possible to perform marketing through advertisement and discount with respect to small stores or objects desired by various people for commercial purposes.

DETAILED DESCRIPTION

Figure 1:
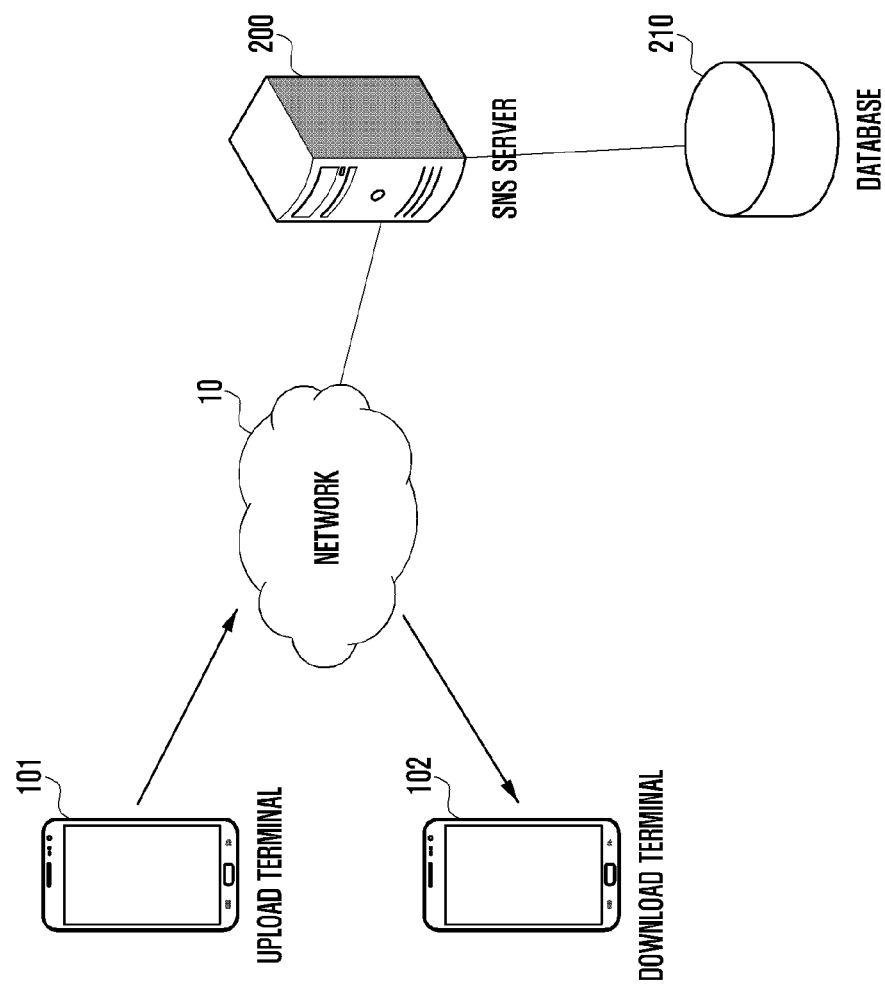
FIG. 1 is a conceptual view of a social network service system to which the present disclosure is applied.

Hereinafter, preferred embodiments of the present disclosure will be described in detail with reference to the accompanying drawings. In the accompanying drawings, the same reference numerals are used for the same constituent elements. Further, the accompanying drawings are provided to help understanding of the present disclosure, and it should be noted that the present disclosure is not limited to the shapes or arrangements that are exemplified in the drawings of the present disclosure. Further, detailed description of well-known functions and structures incorporated herein may be omitted to avoid obscuring the subject matter of the present disclosure. In the following description of the present disclosure, only portions that are necessary to understand the operations according to various embodiments of the present disclosure are described, and explanation of other portions will be omitted to avoid obscuring the subject matter of the present disclosure.

FIG. 1 is a conceptual view of a social network service system to which the present disclosure is applied.

Referring to FIG. 1, a social network service system includes a sender terminal or an upload terminal 101, a download terminal 102, a network 10, a social network service (hereinafter referred to as "SNS") server 200, and a database 210.

The upload terminal 101 may be a terminal that provides specific content to the SNS server 200 through the network 10, or an electronic device (not shown) that can be operated by various users. Any terminal can be used as the upload terminal 101 so far as it can provide content to the SNS server 200 through the network 10. For example, the terminal may be a personal computer (PC), a smart phone, a cellular phone or Hand-Held Phone (HHP), a tablet PC, or a notebook PC, which can communicate with the SNS server 200 through a specific network.

The download terminal 102 may also have the same type or configuration as that of the upload terminal 101. In the present disclosure, terminals are classified as an upload terminal (e.g., the upload terminal 101) and a download terminal (e.g., the download terminal 102), when the terminals provide a message or content (message/content) to the SNS server 200, and the terminals receive a message or content (message/content) from the SNS server 200, respectively.

The SNS server 200 may perform verification of a message/content (message/content) received from the upload terminal 101. If the message/content includes information that may be separately necessary for the SNS server 200, the SNS server 200 may additionally or optionally store the information in a database 210. As described above, the SNS server 200 may provide data that is stored in the database 210 to the download terminal 102 that satisfies a corresponding condition.

The operation of the system according to the present disclosure having the above-described configuration will be briefly described. In the system for providing a service according to the present disclosure, relevance of a method for sharing information is secured. At the same time, through contextually strengthened metadata to be described below, for example, post metadata or stored metadata, user's experiences are provided differently, very simply, amusingly, but more realistically.

In order to provide such a method, there is provided a system for sharing information/content such as SNS that is defined by a specific content posting/accessing/visualizing mechanism based on new rules and limits. In the present disclosure, such message/content is managed through the SNS server 200, but the SNS server 200 may be optional. Any server can be used so far as it can provide a service of a type that is described in the present disclosure. As another method, the system may be configured to be driven on the basis of only resources of a terminal device like a Peer-to-Peer (p2p) system.

First, wordings to be explained hereinafter will be briefly described.

The message or content (message/content) may be a text message, a photo, a video, or a mixture thereof that is provided according to the present disclosure. A user who sends such a message/content is called a sender, and a user who receives a message/content that is stored in the server is called a receiver. Further, in the following description, a sender may also be a sender terminal. Further, a receiver may also be a receiver terminal.

Further, a geo-location (or simply, location) may be geo-location coordinates or location information by known technologies, such as Global Positioning System (GPS), Global System for Mobile communication (GSM) Cell Identification (ID), Code-Division Multiple Access (CDMA) Cell ID, Wi-Fi, Internet Protocol (IP) addresses, radio frequency identification (RFID), Bluetooth (BT)/Bluetooth Low Energy (BLE), and a combination thereof in accordance with the user's situation (indoor/outdoor). In the case where a device-to-device (D2D) connection range is not too wide, for example, within 10 m or 20 m, the location may be indirectly estimated on the basis of D2D communication with other devices.

Hereinafter, the operation of the constituent elements of FIG. 1 and types of data that is provided by the respective constituent elements will be described.

As described above, the message or content (message/content) that is provided by the upload terminal 101 may include one of text, photo, and moving image (video). Further, when the upload terminal 101 provides the message/content to the SNS server 200, it may transmit first additional data and second additional data with the message/content. The first additional data and the second additional data may be generally called "post metadata (Post Metadata)". The post metadata may be automatically generated together with the message/content that is transmitted by the upload terminal 101 to be transmitted to the SNS server 200, or may be generated through user's operation or based on setting information that is preset in the upload terminal 101 to be transmitted to the SNS server 200.

Now, the first additional data and the second additional data of the post metadata will be described.

1) First Additional Data

Information that may be included in the first additional data will be described. It is to be noted that the information that may be included in the first additional data may not be information that is essentially included. The information to be described below may be or may not be included in the first additional data.

(a) Location Information of Sender

The first additional data may include location information of the upload terminal 101 when the upload terminal 101 transmits the message/content to the SNS server 200. The location information of the upload terminal 101 may be acquired in various ways. Further, if needed, the first additional data may not include the location information of the upload terminal 101 that is a sender.

The location information of the upload terminal 101 may be generated in various ways. For example, in the case where the upload terminal 101 can receive a satellite signal and may directly generate geo-localization location information, the upload terminal 101 may provide the location information measured to the SNS server 200. In other cases where the upload terminal 101 may be unable to directly generate the location information, the upload terminal 101 may directly or indirectly provide the location to the SNS server 200. For example, in the case where a device exists in an area or a location that is a verifiable or known, and that is adjacent to the upload terminal 101, the upload terminal 101 may determine the location by acquiring information on the location from the device, and by transmitting the acquired information to the SNS server 200.

A case where the upload terminal 101 does not directly provide the location information to the SNS server 200 may indirectly provide the location information as follows. For example, in the case where the upload terminal 101 is a terminal that belongs to a mobile communication network, the mobile communication network may acquire the location information of the upload terminal 101. In this case, a prescribed entity (not illustrated in FIG. 1) of the mobile communication network may provide the location information of the upload terminal 101 to the SNS server 200.

(b) Method of Determining Location Error of a Sender

Next, the upload terminal 101 may be set to correct a location error. Such a location error correction method may be preset in the SNS server 200 by a user of the upload terminal 101, or may be automatically set by the upload terminal 101 to be transmitted to the SNS server 200. The SNS server 200 may correct an error of the location information provided by the upload terminal 101, or estimate the location based on determining a location error provided by the upload terminal 101. The correction of the location error of the upload terminal 101 may be performed using a geo-localization location authentication program or the like.

(c) Post Date Information

The upload terminal 101 may include post date information of the message/content to be uploaded. The post date information may be obtained using time stamp information transmitted by the upload terminal 101.

(d) Context Information

In addition, the upload terminal 101 may include various contexts as the first additional data. For example, the upload terminal 101 may include state or context information of the upload terminal 101. Here, the state or context information of the upload terminal 101 may include at least one of network connectivity, battery level, device type, Operating System (OS) type, Internet Protocol (IP) address, and the Media Access Control (MAC) address.

2) Second Additional Data

Information in the second additional data will be described. It is to be noted that the information in the second additional data to be described hereinafter may not be information that is essentially included. The information to be described below may be or may not be included in the second additional data.

(a) Display Location of Message/Content

The second additional data may include location (or area) information for providing of the message/content based on a demand of a sender, for example, via an interface (not shown) of the upload terminal 101. For example, a user may specifically request through the demand a desired location for providing and/or displaying the uploaded message/content. As an example, an upload user may provide location information for an uploaded message/content where content may be displayed through demands like "Display only within the radius of 200 m of YY, XX-dong, Seoul, Korea". As another example, a radius information may also be automatically set as a default or predetermined distance demand by the SNS server 200, or the radius information that is preset by an upload user in the SNS server 200 may be automatically set.

As still another example, a specific desired display area information may be defined other than including the location information or radius information. For example, a specific area may be set like "Display in XX-dong, Seoul, Korea" or "Seoul, Korea". This enables a user who uploads the message/content to transmit the message/content to a specific destination area other than transmitting the message/content to a specific object.

Here, an operation to set a display location of the message/content using a specific interface that is provided by a sender terminal 101 will be briefly described.

The sender terminal 101 can set or predetermine a preference of the sender, and define at least a place where the message/content is to be displayed. That is, when transmitting the message/content, the sender terminal 101 may set an area in which the receiver(s) (receiver terminal) can access or see the message/content based on a map or a destination area (Area_Destination).

(b) Preference/Profile of Sender

The second additional data may also include a preference or a profile (preference/profile) of a sender. The preference/profile of a sender may include an information sharing rule of the message/content that is transmitted by the sender, personal information setting, and information filtering rule. For example, the sender may refuse to identify his/her own location information in the profile. Further, the sender may provide a rule for information sharing of the message/content.

(c) Message Type

Various types of the message/content may be included in the second additional data as follows. Specifically, the message type may identify one or more types of the message/content transmitted by a sender. For example, the message/content transmitted by the sender may be a general message or a sponsor message. For example, the sponsor message may be a specific message for a game having a specific function or ability, for example, game release, special right provider, take-and-drop (like a flag), amusement, or collection. Such types will be described in more detail with reference to the drawings to be described later.

(d) Accessibility Conditions of Message

The message/content included in the second additional data may have specific limit or accessibility conditions. For example, a sender may limit how message/content is transmitted or accessed with a receiver's identifier (like an e-mail address or user identifier (ID)). Such accessibility conditions may be used when the message that is nonpublic is transmitted to a specific person or persons of a specific group. The accessibility conditions will be described in detail.

When a search/access request is transmitted, various limit conditions may be set.

a) Limited to a Street or the Vicinity of a Destination

A limit or accessibility condition may be a limited area access for a receiver. For example, when transmitting the message/content, a sender may set the accessibility condition so that among receivers that can receive the corresponding message/content, "only persons in Seoul" can access the message/content, or only persons (terminals) located within a radius of 200 m from a specific location Y designated by the message can view (receive) the message/content. In this case, parameters used for location limits may be optionally set by the user, or may be limited to some conditions predetermined by the SNS server 200.

b) Temporal Limits

Further, search and access limits may be temporal limits. For example, a sender may set a message/content that is to be sent to be only viewable at a predetermined time, for example, between 12:00 and 14:00.

c) Other Limit Types

As another example, a sender may limit accessibility of a message/content to be transmitted using a message designation password or tag. Such a message designation password or tag may be used as hash-tag.

As still another example, a sender may limit accessibility of a message/content to be transmitted using usual access conditions as provided in a sender's family or contact list. As still another example, several access levels may be prescribed, and access conditions for the respective levels may be prescribed.

a. Access of a location of a message
    b. Access of a title of a message
    c. Access of a type of a message
    d. Overall access of a message With respect to the types as exemplified above, a sender may select a filtering condition of a receiver. For example, various types of filtering conditions may be provided, such as only females, only users who use Chinese as a basic language, only users who use Korean as a basic language, and only users who use English as a basic language. The use of such conditions may be limited, for example, with respect to a commercial use.

(e) Link Information Related to Content or a Message

The second additional data may include link information related to the message/content. Here, "link information" may mean a directional link of the message/content with respect to another message/content. For example, if a response from a specific receiver to the message/content transmitted by a sender exists, a directional link may be generated for the response. For specific example, a sender may indicate successive points on a map in order to generate a tourism route of a specific area or a path route of a walk. The indication of such successive points on the map may be manually performed by a user, or may correspond to information that is generated as a sender terminal acquires locations on the map in a predetermined time interval, for example, every 5 minutes or 10 minutes. Such link information may be a directional link set in relation to the corresponding content when a user provides the message/content.

The sender terminal or the upload terminal 101 may transmit information that includes the post metadata as described above together with the message/content. Accordingly, the message/content that the sender terminal or the upload terminal 101 transmits to the SNS server 200 may have the following type.

"Message/content+first additional data+second additional data"

Hereinafter, the operation of the SNS server 200, the type of data that is stored in the database 210 of the SNS server 200, and the type to provide the stored data to the receiver or the download terminal 102 will be described.

As described above, the upload terminal 101 transmits the message/content to the SNS server 200. In this case, the message/content may be transmitted in the form of "message/content+post metadata (first additional data+second additional data)".

The SNS server 200 checks the post metadata provided with the message/content, and determines whether correction of the checked post metadata is necessary. If the correction of the post metadata is necessary, the SNS server 200 corrects the received post metadata and stores the corrected post metadata in the database 210.

Accordingly, the post metadata that is provided by the upload terminal 101 may be the same as or may be different from saved metadata (Saved Metadata) that is actually stored in the database 210.

The configuration of the saved metadata will be first described. The saved metadata may be configured in the following form.

"Verified first additional data+verified second additional data+third additional data"

In the above-described message configuration, the "verified first additional data" may be the first additional data included in the post metadata, and may also be in the form in which a part of the first additional data is modified or added. Further, the "verified second additional data" may be the second additional data included in the post metadata, and may be in the form in which a part of the second additional data is modified or added. Here, the term "modified" may include not only modification but also removal of the respective first additional and/or second additional data. Hereinafter, modification of information included in the first additional data will be described.

(a) Location Authentication/Verification

The SNS server 200 may verify location information of a sender included in the first additional data through a predetermined verification program or procedure. If reliability of the location data of the sender information is low, or an authentication has not succeeded as a result of the verification of the location information of the sender, the SNS server 200 may determine that the location data has been changed or the location of the sender has not been defined.

(b) Post Date Information

The SNS server 200 may receive a time stamp included in the first additional data to be transmitted. In this case, the time stamp information included in the first additional data to be transmitted by the sender may be adjusted or replaced through the SNS server 200. This may correspond to a case where a user of the upload terminal 101 optionally set visual information other than automatically set the visual information. For example, in the case where the current time is July, 2014, and sending time information on the time stamp is set to July, 2000 or July, 2017 in the upload terminal 101, the SNS server 200 may self-correct the time stamp information or may change the time stamp information based on the visual information included in the SNS server 200.

Next, modification of the information included in the second additional data will be described.

The display location of the message/content may be designated in the second additional data. As described above, the location of the message/content may be designated in various forms. For example, the display area may be limited to "Seoul" or "XX-dong, Seoul" or may be designated to "within the radius of 500 m based on a specific building". In this case, the SNS server 200 may limit the frequency of location designation of the message/content based on the location of the sender, or may add or limit the reliability. For example, in the case where an upload terminal (e.g., the upload terminal 101) in London, United Kingdom transmits specific message/content with designation of "within the radius of 500 m of YY, XX-dong, Pusan, Korea", the reliability may be low. In this case, reliability information may be added, or if a distance between the upload terminal and a display location (e.g., of the download terminal 102) is greater than or equal to a predetermined value, transmission of the corresponding message/content may be limited to one day.

As described above, the SNS server 200 configures the saved metadata through not only correction of the post metadata but also addition of third additional data. The third additional data included in the saved metadata will be described.

Third Additional Data (a) Display Function

A function provided to the download terminal 102 to be displayed may be set. For example, if it is assumed that the coordinates of a location where a message/content that is transmitted by the upload terminal 101 is displayed are x, and the coordinates of the location of the download terminal 102 are y, the display function may be a function for display based on {x, y}. For example, the color or size displayed on the download terminal 102 may be changed according to a distance between x and y. For example, when the distance approaches within a predetermined distance, for example, within 100 m, the message/content may change from a base color of black to a blue. When the message/content is displayed with a blue color, it may be considered to be locally dropped.

Accordingly, if a separate distance from the message/content to be displayed is equal to or longer than 100 m, the message/content may be displayed in black. In the case where the message/content is displayed in black, it may be qualified as distant dropping.

On the other hand, a commercially supported message, for example, discount information in a specific selling area or gift giving information, may be displayed with a predetermined color, such as red color.

(b) Life Time

The life time of a post of the message/content may be set in various ways. For example, a basic post time may be set and then may be extended or shortened based on various variables. For example, it is assumed that the basic post time of the message/content is set to 2 hours. In this case, if a user of the upload terminal 101 who intends to post the message/content desires a post time that is longer than the basic post time, the sender may purchase an item or use other coupons or points to extend the basic post time or to extend the basic post time.

Further, it is also possible to extend or shorten the life time of the post in accordance with various post conditions, such as, for example, popularity of the posted message/content. For example, evaluation information may be acquired from the download terminal 102 that has received the corresponding message/content, and the post time may be extended or shortened based on the acquired evaluation information. As an example, it is possible to extend the life time by 1 minute whenever acquired information corresponding to "Good" is received from 10 users who have downloaded a specific posted message/content, and to shorten the life time by 5 minutes whenever acquired information corresponding to "Bad" is received on the same condition. In the case where the information corresponding to "Normal" is received, the life time may not be extended or shortened. As described above, the life time can be varied, and when the life time expires, the post of the corresponding message/content may be terminated. In this case, if the post condition is set to unconditionally 1 hour or unconditionally 2 hours by the sender, that is, the upload terminal 101, any additional process for the life time of the content may not be performed.

(c) Message Reception

In the case where the SNS server 200 posts the message/content uploaded by the upload terminal 101 with respect to a specific area or specific persons, marks may be given to the uploaded message/content. Such marks may depend on the sender's profile or sender's marks. Further, such sender's marks may be given using general statistics of visit/feedback and the number of inquiries, the frequency of "Good", and the frequency of "Bad". In addition, the marks may be given using timer values and profile information of persons who like/recommend the message. One of the above-described pieces of information may be used, or two or more pieces of information may be used in combination.

(d) Message State

Figure 2:
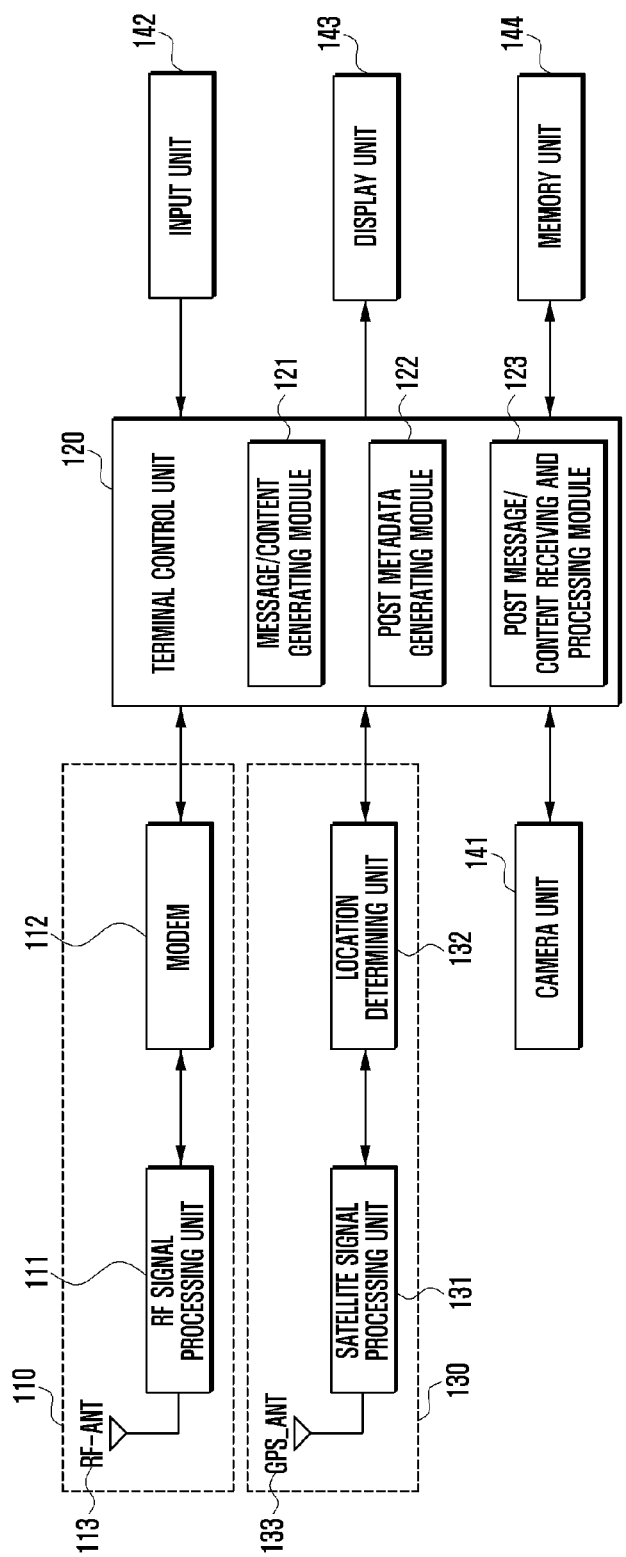
FIG. 2 is a functional internal block diagram of a terminal for performing transmission and reception of a message/content according to the present disclosure.

The SNS server 200 may add or identify state information to a message/content posted by a sender, or a poster (e.g. the upload terminal 101), and may store or record the state information in a database 210 (of FIG. 2). For example, if the life time of data corresponding to the message/content received from the upload terminal 101 expires, the SNS server 200 may set the state information of the message/content to a dead state. However, if the life time has not expired, the SNS server 200 may store or record an alive state as the state information. Further, if the message/content is a take-and-drop message, the SNS server 200 may add message state information to the message/content on whether the message/content is in a taken state or in a dropped state after being taken in a specific download terminal, and store the message/content with the message state information. If the number of take-and-drop messages is limited, for example, in the case of 100 take-and-drop messages, the respective messages may have different life times depending on whether the messages are used.

For example, it is assumed that souvenirs and gifts are provided to visitors who have acquired take-and-drop messages and visit a specific store. In this case, if it is processed that a user has acquired or taken the corresponding take-and-drop message from a specific download terminal and visits the corresponding store to receive the souvenir or gift, the take-and-drop message is set as a used message, and the SNS server 200 may store the corresponding take-and-drop message in the database 210 in a state where the life time of the take-and-drop message has expired.

FIG. 2 is a functional internal block diagram of a terminal for performing transmission and reception of a message/content according to the present disclosure.

FIG. 2 illustrates an internal configuration of both an upload terminal (e.g., the upload terminal 101 of FIG. 1) and a download terminal (e.g., the download terminal 102 of FIG. 1) that are exemplified to be able to perform wireless communication. However, as described above, it is not necessary that the upload terminal or the download terminal is a terminal that can perform wireless communication. For example, the terminal may also be connectable to the SNS server 200 through, for example, a wired network. However, in consideration of user's portability, a terminal that can perform wireless communication may be more appropriate. Further, the configuration of the terminal as exemplified in FIG. 2 is illustrated only for understanding of the present disclosure, and it is to be noted that the upload terminal or the download terminal according to the present disclosure is not limited to that as illustrated in FIG. 2. For example, a camera unit 141 or a satellite signal receiving unit 130 may be removed from the configuration as exemplified in FIG. 2, or more constituent elements than the constituent elements illustrated in FIG. 2 may be further included therein.

Referring to FIG. 2, the internal configuration of the upload terminal and the download terminal will be described.

Referring to FIG. 2, the terminal includes an RF signal transmitting/receiving unit 110, a satellite signal receiving unit 130, a terminal control unit 120, a camera unit 141, an input unit 142, a display unit 143, and a memory unit 144.

First, the internal configuration of the RF signal transmitting/receiving unit 110 will be described. An RF antenna RF_ANT 113 receives an RF band signal and provides the received RF signal to an RF signal processing unit 111, and/or radiates or transmits an RF band signal generated by the RF signal processing unit 111. The RF signal processing unit 111 converts data to be transmitted into a transmission band signal with a band rise to emit the converted transmission band signal through the RF antenna RF_ANT 113, and converts a reception band signal that is received through the RF antenna RF_ANT 113 into a baseband signal to output the converted baseband signal. Signals and/or data output from the RF signal processing unit 111 may be received at a modem 112 to be demodulated and decoded. The demodulated decoded signal may be provided from the RF signal processing unit 111 to the terminal control unit 120. Further, the modem 112 encodes and modulates data received from the terminal control unit 120 and outputs the modulated signal to the RF signal processing unit 111.

Next, the configuration of the satellite signal receiving unit 130 will be described. A satellite signal processing unit 131 converts a satellite signal that is received from a GPS antenna GPS_ANT 133 into a baseband signal to output the converted baseband signal. In this case, the satellite signal processing unit 131 may receive signals from three or more satellites through the GPS antenna GPS_ANT 133. A location determining unit 132 may acquire current location information of the terminal using the signals received from the plurality of satellites. The location determining unit 132 provides the acquired location information to the terminal control unit 120.

The terminal control unit 120 may include a message/content generating module 121, a post metadata generating module 122, and a post message/content receiving and processing module 123. The respective modules 121, 122, and 123 that are included in the terminal control unit 120 may be configured by hardware or software. The respective configurations will be described in more detail.

The message/content generating module 121 performs a control operation when a message/content to be posted is generated. For example, the message/content generating module 121 controls reception and processing of a specific message input by a user. The message/content generating module 121 also controls operations of taking or recording of an image, and/or moving of the image for content production, when the user of the upload terminal generates a message/content to be posted with respect to a specific location or area, or a specific download terminal, and generates a resulting message/content. In the case of simply transmitting a message only, the control operation may be the same as an input of a general Short Message Service (SMS) or a Multimedia Messaging Service (MMS) message. Further, in the case of transmitting a photo only, a photo and a text, or a video and a text, the control operation may be the similar as a transmission of a MMS message. The message/content generating module 121 may also perform a control operation related to a direct production of the message/content a user intends to post.

A post metadata generating module 122 generates the first additional data and the second additional data as described above with reference to FIG. 1, and adds or inserts the generated first additional data and second additional data to the message/content. In this case, the post metadata generating module 122 may operate in a manner that the first additional data and the second additional data may be automatically added or inserted in accordance with a value predetermined by a user. In other embodiments, information on the additional data to be applied to a specific message/content only is separately input before or after the message/content is produced or generated. If a user's input is required, the post metadata generating module 122 controls the display unit 143 to provide a user interface for the corresponding information in the form of graphics or text.

The post message/content receiving and processing module 123 may operate to receive the post message/content received from the SNS server 200 and to provide the received post message/content to a user in the form of a text, graphics, a moving image or video, or a combination thereof. Accordingly, the post message/content receiving and processing module 123 controls the display unit 143 to provide the posted message/content to the user.

The camera unit 141 includes a lens (not shown) for collecting reflected light of an object, an iris (not shown) for controlling a focus, and an image sensing module (not shown) for processing light reflected from the object as image data. The camera unit 141 may acquire a photo or a still image of the object, and/or a moving image or video through the above-described configuration, and may provide the acquired photo or moving image or video to the terminal control unit 120.

The input unit 142 generates a signal corresponding to user's input and provides the signal to the terminal control unit 120. The input unit 142 may include, for example, keys for generating user input signals through recognition of user's pressing or various kinds of sensors for recognizing user's touch or gesture, or a hard key (such as, e.g., key 604 of FIG. 6A).

The display unit 143 may be implemented in various forms of LCD and LED, and may provide the operation state of an electronic device, time information, and battery information to a user in the form of graphics or text. Further, the display unit 143 may display various texts, such as post message/content information, post metadata information, posted message/content information, and reception information thereof, photos, moving images, or a combination thereof.

The memory unit 144 may store various kinds of data required for the operations of the upload terminal 101 and the download terminal 102. The memory unit 144 may also store control data required when the post message/content is generated, control data required for generation of the post metadata, and data for control when the posted message/content is received. A case where the stored data is operated on the terminal control unit 120 may be a case where the message/content generation module 121, the post metadata generating module 122, and the post message/content receiving and processing module 123 are configured by software.

Figure 3:
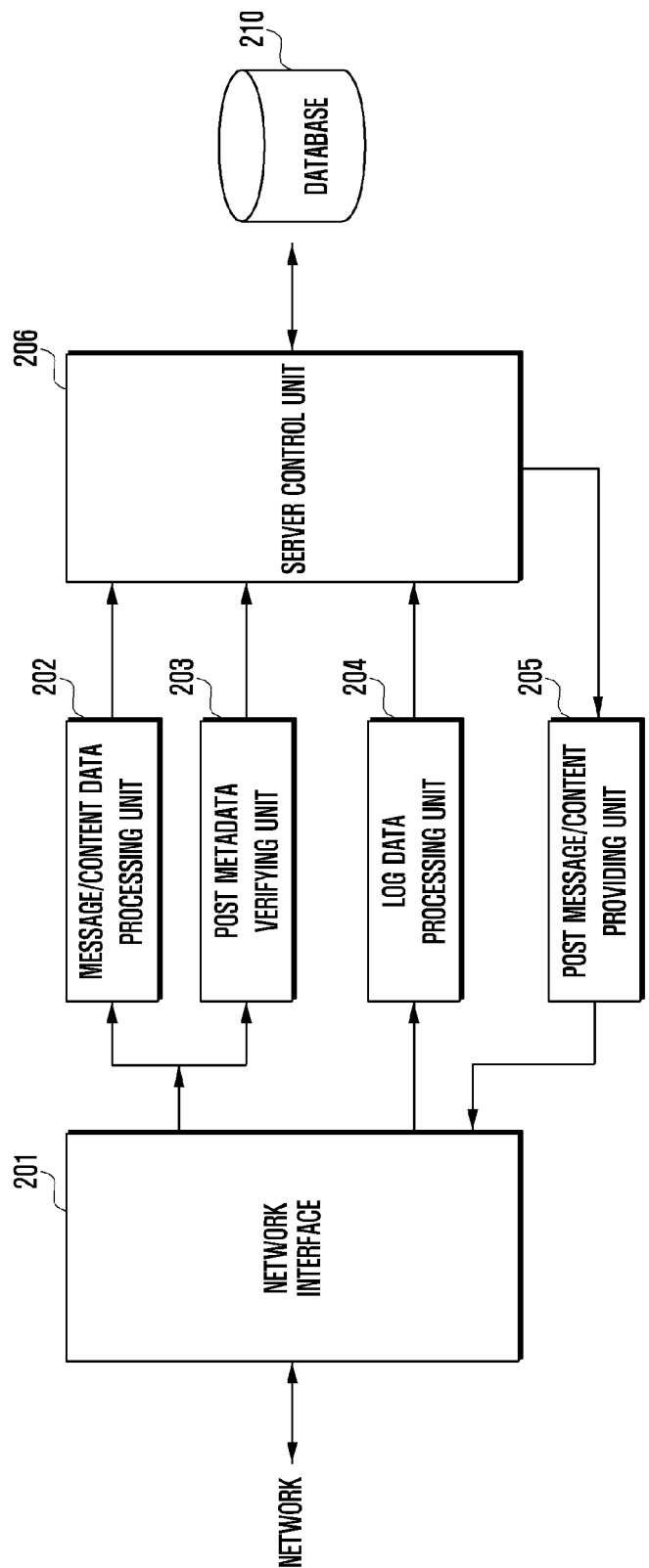
FIG. 3 is a functional internal block diagram of an SNS server for receiving and providing a posted message/content according to an embodiment of the present disclosure.

FIG. 3 is a functional internal block diagram of an SNS server (e.g., similar to the SBS server 200 of FIG. 1) to receive and provide a posted message/content according to an embodiment of the present disclosure.

A network interface 201 interfaces data transmitted and/or received between the SNS server 200 and a network (e.g., the network 10 of FIG. 1). Consequently, the network interface 201 controls data transmission and/or reception with the upload terminal 101 or the download terminal 102 through the network (e.g., the network 10 of FIG. 1).

The network interface 201 may send/receive data with a message/content data processing unit 202, a post metadata verifying unit 203, a log data processing unit 204, and a post message/content providing unit 205 in accordance with the kind of received data.

First, if a specific user connects to the SNS server 200, the log data processing unit 204 may process log data of the corresponding user terminal. For example, in the case of an initial connection signal, the log data processing unit 204 receives identifier information of the specific user and provides the received identifier information to the server control unit 206. Through this, the server control unit 206 may operate to acquire whether a user who attempts a connection is a registered member, whether specific preference information is stored, or information on a main used language and area if the user is a registered member. Further, the log data processing unit 204 may receive location information of the specific user terminal together or separately from another system entity. In general, processing of the log data processing unit 204 may be implemented in the same manner as or a similar manner to the basic operation to perform an authentication procedure when the user connects to the server that exists on a web.

Further, in the case of receiving the post message/content, the network interface 201 may dividedly output the message/content data and the post metadata. In the case where the network interface 201 does not provide a function to dividedly output the message/content data and the post metadata, a separate block configuration for dividedly outputting the message/content data and the post metadata may be provided. In the present disclosure, it is assumed that the network interface 201 perform the above-described operation.

The message/content data processing unit 202 may receive message/content data that is provided from the network interface 201, generate corresponding data in the form for being stored, and provide the generated data to the server control unit 206.

Further, the post metadata verifying unit 203 may receive the post metadata for the message/content data that is provided from the network interface 201, and perform verification of the post metadata. Through such verification, correction or verification of the location information as described above with reference to FIG. 1 may be performed, and verification or replacement of the validity of the time stamp may be performed. The post metadata verifying unit 203 performs such a process, and then provides the verified data to the server control unit 206.

If the server control unit 206 receives the message/content to be posted and the verified post metadata corresponding to the message/content to be posted, the server control unit 206 generates third additional data. The third additional data has been described with reference to FIG. 1. If stored metadata is generated as above, the server control unit 206 stores the generated stored metadata in the database 210 together with the message/content data.

Further, the server control unit 206 may update the specific stored metadata based on log information received from the log data processing unit 204. For example, as described above, the server control unit 206 may change message state information including an activation time of the message/content in accordance with the popularity as described above, or may update information of the message/content used together with the take-and-drop message or number information to store the updated information in the data base 210.

The server control unit 206 may also acquire user identifier information included in the log data of a specific user acquired from the log data processing unit 204, user's preference stored corresponding to the identifier information, and information on the post message/content to be provided on the basis of the main used language information from the database 210. In this case, the server control unit 206 may select the post messages/content to be provided using the location information of the terminal provided from the log data processing unit 206. In contrast, the server control unit 206 may first select the post message/content using the location information of the terminal, and then may acquire information on the message/content to be posted on the basis of the user's preference and the mainly used language information from the database 210.

Accordingly, the data stored in the database 210 may be the post message/content, the verified first additional data, the verified second additional data, and/or the third additional data. In this case, a part of each of the respective additional data may be continuously updated under the control of the server control unit 206.

Further, if the message/content to be provided to various receiver terminals, i.e., the download terminals 102, is searched for, the server control unit 206 may provide information based on the third additional data as described above. For example, if the messages/content of which conditions to be provided to the corresponding terminal are satisfied is searched for among the posted specific messages/content, the server control unit 206 may provide the whole or only a part of the stored metadata for the corresponding message/content other than providing information on the messages/content that satisfy the conditions. Through this, the user terminal can acquire in which direction and to what extent the separate distance, in which the post message/content exists, is provided from the current location on the map.

After providing the stored metadata to the user terminal, the server control unit 206, the server control unit 206 may operate to provide the message/content of specific stored metadata when the corresponding message/content is requested from the user terminal. That is, the server control unit 206 may operate to provide the corresponding message/content data through the post message/content providing unit 205.

Accordingly, the post message/content providing unit 205 can provide the stored metadata provided from the server control unit 206 to a specific user, and provide the message/content corresponding to one or two or more pieces of the stored metadata to the specific user.

Figure 4:
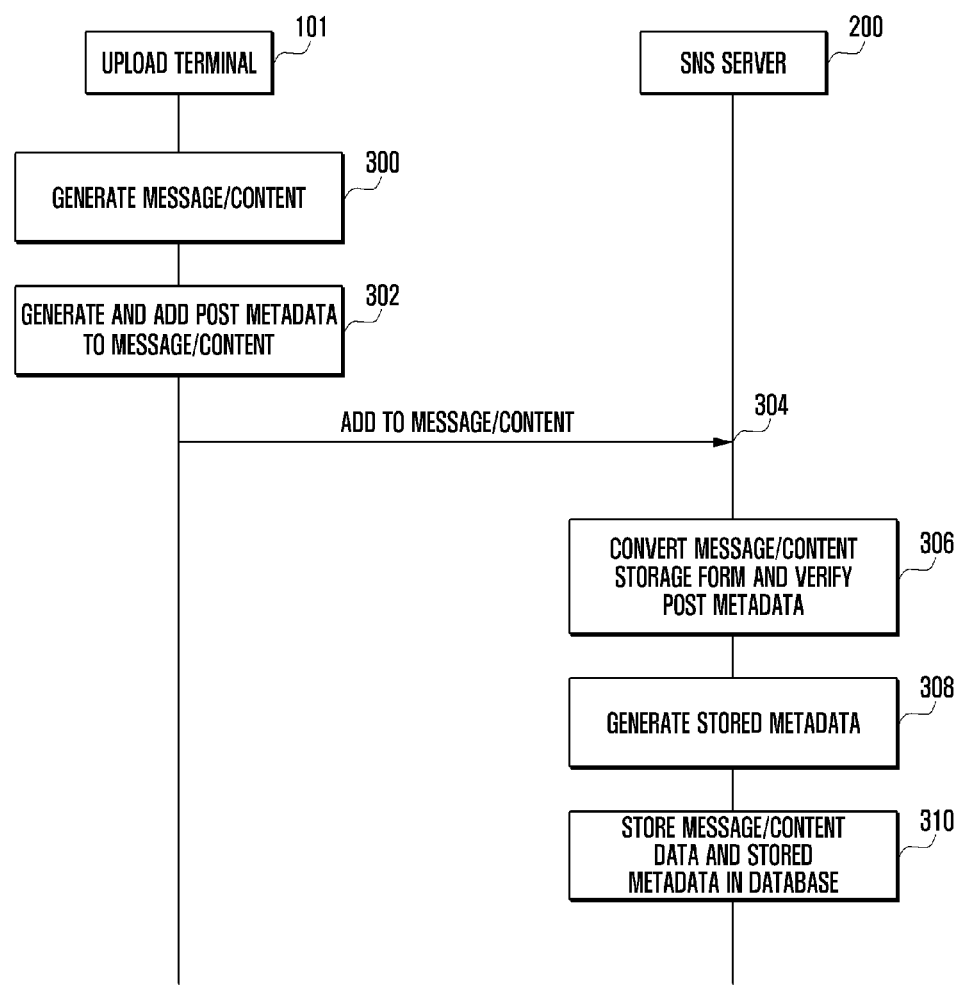
FIG. 4 is a flowchart explaining signal flow and control between an upload terminal and an SNS server when the upload terminal provides a posted message/content to the SNS server according to the present disclosure.

FIG. 4 is a flowchart explaining signal flow and control between an upload terminal (e.g., the upload terminal 101 of FIG. 1) and an SNS server (e.g., the server 200 of FIG. 1) when the upload terminal provides a posted message/content to the SNS server according to the present disclosure.

The message/content generating module 121 of the upload terminal 101 generates message/content to be posted at operation 300. The generation of the message/content may be performed on the basis of user's taking of a photo, or moving image or video using the camera unit 141 (of FIG. 3) or the user input information provided from the input unit 142. The information generated as above may become the post message/content.

If the generation of the message/content to be posed is completed, the post metadata generating module 122 of the upload terminal 101 generates post metadata at operation 302. In this case, the post metadata generating module 122 may generate the post metadata based on the information stored in the memory unit 144 and the user input information. For example, the sender location information of the first additional data generates location information x of the sender terminal based on the information received from the satellite signal receiving unit 130, and a location error determining method may read a form pre-stored in the memory unit 144. Further, the post date information may generate the time stamp using the time information that is provided in the terminal control unit 120, and context information may be information that is managed by the terminal control unit 120 or is stored in the memory unit 144.

Accordingly, the post metadata generating module 122 may generate the first additional data using the information that is stored in the memory unit 144 based on such information or the information managed by the terminal control unit 120.

The post metadata generating module 122 may also generate the second additional data. Display location information y of the message/content that is the second additional data may generate location information on the basis of information that a user inputs through the input unit 142. In order to display such location information, the post metadata generating module 122 may operate to display map data of an area where the terminal is currently located on the display unit 143 with a predetermined magnification. Further, the post metadata generating module 122 may be provided with a search window for searching for the location that the user intends to select, and a user can receive information of the location where the message/content is to be posted.

In addition, a sender's preference or profile may be information pre-stored in the memory unit 144, and message type information may be set according to a selected type when the message/content is initially generated or may be additionally generated on the basis of a user input. Further, the accessibility conditions may also be generated on the basis of a user input. The link information that is related to the message/content may be configured to link information that is pre-stored in the memory unit 144 or is stored in a server or an SNS server on another web. Accordingly, the post metadata generating module 122 may generate the second additional data based on such information.

If the message/content data is generated through operation 300 and operation 302 and the post metadata is generated and added thereto, the post message/content is completed. Accordingly, at operation 304, the terminal control unit 120 controls the RF signal transmitting/receiving unit 110 to transmit the post message/content to the SNS server 200 through the network 10.

In the case of receiving the post message/content that is generated as described above and is transmitted from the upload terminal 101, the operation of the SNS server 200 will be described.

If the post message/content is received at operation 304, the network interface 201 of the SNS server 200 dividedly outputs the message/content data and the post metadata. The divided message/content data is provided to the message/content processing unit 202, and the post metadata is input to the post metadata verifying unit 203.

At operation 306, the message/content processing unit 202 may convert the data portion of the received message/content in the form for being stored or may maintain the data portion as it is. Further, at operation 306, the post metadata verifying unit 203 may perform verification of a portion that requires verification among the post metadata, and if needed, may change the corresponding data. Since the verification and change has already been described with reference to FIGS. 1 and 3. At operation 306, the verified post metadata and the message/content data are provided to the server control unit 206.

Accordingly, the server control unit 206 reads information to be stored together with the post metadata that is verified at operation 308 from the database 210 and generates the third additional data. Thereafter, at operation 310, the server control unit 206 stores the message/content data in the database 210 together with the stored metadata.

Figure 5:
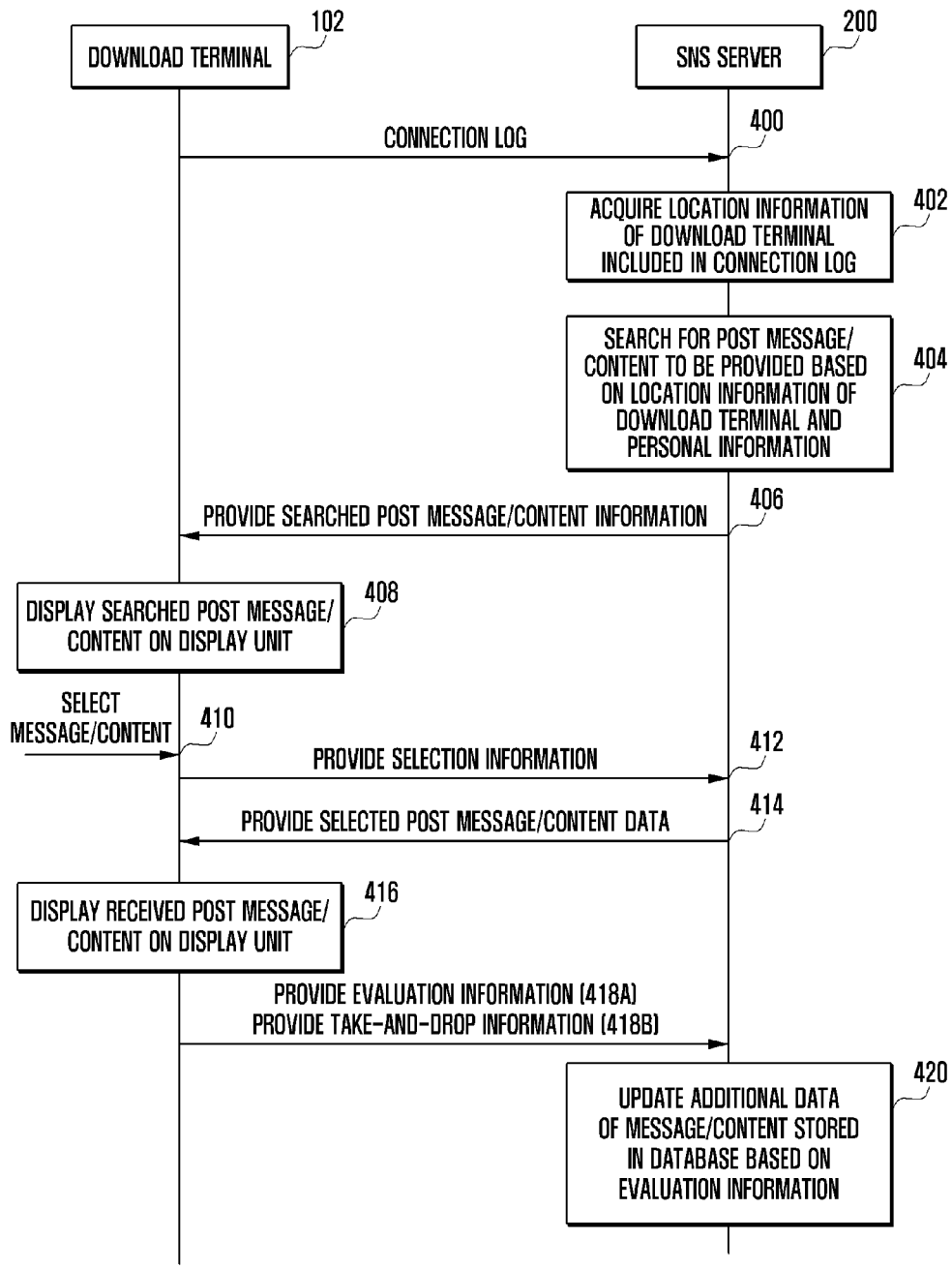
FIG. 5 is a flowchart explaining signal flow and control between a download terminal and an SNS server when the download terminal searches for and provides a posted message/content that is to be provided to the download terminal when the download terminal is connected to the SNS server.

FIG. 5 is a flowchart explaining signal flow and control between a download terminal and an SNS server (e.g., the SNS server 200 of FIG. 1) when the download terminal searches for and provides a posted message/content that is to be provided to the download terminal when the download terminal is connected to the SNS server.

When the download terminal 102 connects to the SNS server 200 at operation 400, the download terminal 102 controls the RF signal transmitting/receiving unit 110 to request a connection with the location information and the identifier information of the download terminal 102. In this case, the location information of the download terminal 102 may be provided to the SNS server 200 in the form of a separate message. In other embodiments, the SNS server 200 may request the location information from the download terminal 102. In the case of a terminal that can perform a mobile communication service, the location information may be provided from a specific entity of a mobile communication network. Hereinafter, for convenience in explanation, it is described that at operation 400, the location information and the identifier information are provided together.

If the connection log information is received at operation 400, the server control unit 206 of the SNS server 200 may acquire the location information of the download terminal 102 through the log data processing unit 204 at operation 402. Further, at operation 404, the server control unit 206 may automatically search for the post message/content to be provided to the download terminal based on the user information that is stored in the database 210 and the location information of the download terminal 102 that is acquired at operation 402.

When the post message/content is searched for, the server control unit 206 may acquire information on user preference information of the download terminal 102 that is stored in the database 210, nationality of a user, used language, and sex. Based on such information, the server control unit 206 may acquire information to be provided to the user of the download terminal 102. Here, explanation has been made based on the contents of the automatic search. However, a user may input a specific search condition for the search.

Now, a search method that is performed by the server control unit 206 will be described in more detail.
Content Search Procedure With respect to respective search requests that are provided to the SNS server 200, metadata on strengthened context, which is called "retrieval metadata (Retrieval_Metadata)" that is implicitly or specifically constructed, may become connectable automatically or manually. The retrieval metadata may include two types of information.
(1) Receiver Information
    (a) Information on situation/state of a receiver device, and particularly its location x and related error time stamp may be acquired.
    (b) Receiver's selection information, for example, specific selection information when the content is requested, such as general selection in a profile+search keyword, may be included.

Such sender's selection information may additionally include the following information.
    Map view information (MapViewInfo): A receiver may determine to limit its own request/search for a specific geographical area. For example, information that a user currently displays on the display unit 143, i.e., information that explains a map area that a user is seeing, may be included in such information.

Time view information (TimeViewInfo): A receiver may select a time interval so as to receive only content that is posted within a separate distance in a preset distance with the receiver, or content that is alive within a preset separate distance.

Location y based filtering of sender location (x) post message/content: A receiver may request to perform filtering of content that is locally posted (X that is close to y) or content of which a sender has a location close to me (X that is close to x').

The server control unit 206 may acquire an appropriate result among the post message/content stored in the database 210 based on the received information as described above, i.e., information included in recovery metadata.

Further, the server control unit 206 is required to cope with the following cases during a search operation. First, if an error is too large during authentication or verification of receiver's location information, it may be set that the receiver's location information is not defined. Second, receiver's selection may require verification of compatibility of receiver information using receiver's own content access right. For example, the receiver may access only information that exists in a neighboring threshold value (Th_Neighbour) from a receiver's estimated location (x'), or may set to have an access limit with respect to the post message/content for which a preset time, for example, one week or more, has elapsed.

Here, the neighboring threshold value may be set to a distance, a radius, or a visible area that the receiver can reach by 10 minutes' walk, for example, 1 km.

When the search is performed to meet such a search condition, the server control unit 206 may be configured to provide a specific query to the database 210 and to provide a response to the query. Various types of queries and responses can be provided to search the database 210, and in the present disclosure, the query and the response are not specially limited.

As described above, at operation 404, the server control unit 206 may acquire the post message/content to be provided to the download terminal 102. In this case, two or more post messages/pieces of content may be acquired. Accordingly, if the post message/content and the corresponding stored metadata are acquired at operation 404, the server control unit 206 operates to provide the post message/content information that is searched for at operation 406 through the post message/content providing unit 205. In this case, information that is provided by the post message/content providing unit 205 may be actually posted message/content data, a part or the whole of the stored metadata of the posted message/content, or information that includes all of them. In an embodiment of the present disclosure, it is assumed that a part of title information and stored metadata is provided.

The terminal control unit 120 of the download terminal 102 receives a part of the title information and the stored metadata. That is, if the post message/content receiving and processing module 123 receives the title of the searched post message/content and the stored metadata, the post message/content receiving and processing module 123, at operation 408, may display the title information on the display unit 143 or may display the title information so that the title information takes a point shape having a color. In this case, one or two or more titles or points may be displayed. Further, since the color of the displayed points has been described, the duplicate explanation thereof will be omitted.

Thereafter, at operation 410, the post message/content receiving and processing module 123 may receive one signal selected from the pieces of information displayed on the display unit 143 from the input unit 142.

In this case, if the whole message for the searched post message/content is not received, the post message/content receiving and processing module 123, at operation 412, may provide the selection information to the SNS server. However, if all the information is received for the post message/content that has already been searched for at operation 406, operation 412 and operation 414 may be omitted.

If the selection information is received at operation 412, the server control unit 206 of the SNS server 200 is in a state where it has not transmitted the whole message, and thus provides data on the selected post message/content to the download terminal 102.

Accordingly, at operation 416, the post message/content receiving and processing module 123 of the download terminal 102 controls the display unit 143 to display the corresponding post message/content at operation 416. Thereafter, when the evaluation information is provided by the user, the post message/content receiving and processing module 123 may provide the evaluation information to the SNS server 200. As described above, the evaluation information may be composed of information corresponding to information, such as "Good", "Normal", and "Bad".

As another example, in the case of take-and-drop message/content, the post message/content receiving and processing module 123 of the download terminal 102 may generate and provide information corresponding to the take and drop to the SNS server 200 in a state where the post message/control receiving and processing module 123 controls the display unit 143 to display the corresponding post message/content at operation 416.

Then, the server control unit 206 of the SNS server 200 can update stored additional data of the post message/content that is stored in the database 210 based on the evaluation information or the take-and-drop information. As described above, such updating may be extension or shortening of the activation time.

Now, a user interface when the upload terminal 101 and the download terminal 102 transmit and receive the post message/content as described above will be described.

FIGS. 6A through 6G are views exemplifying user interfaces between an upload terminal and a download terminal when a posted message/content is transmitted and received according to the present disclosure.

Figure 6A:
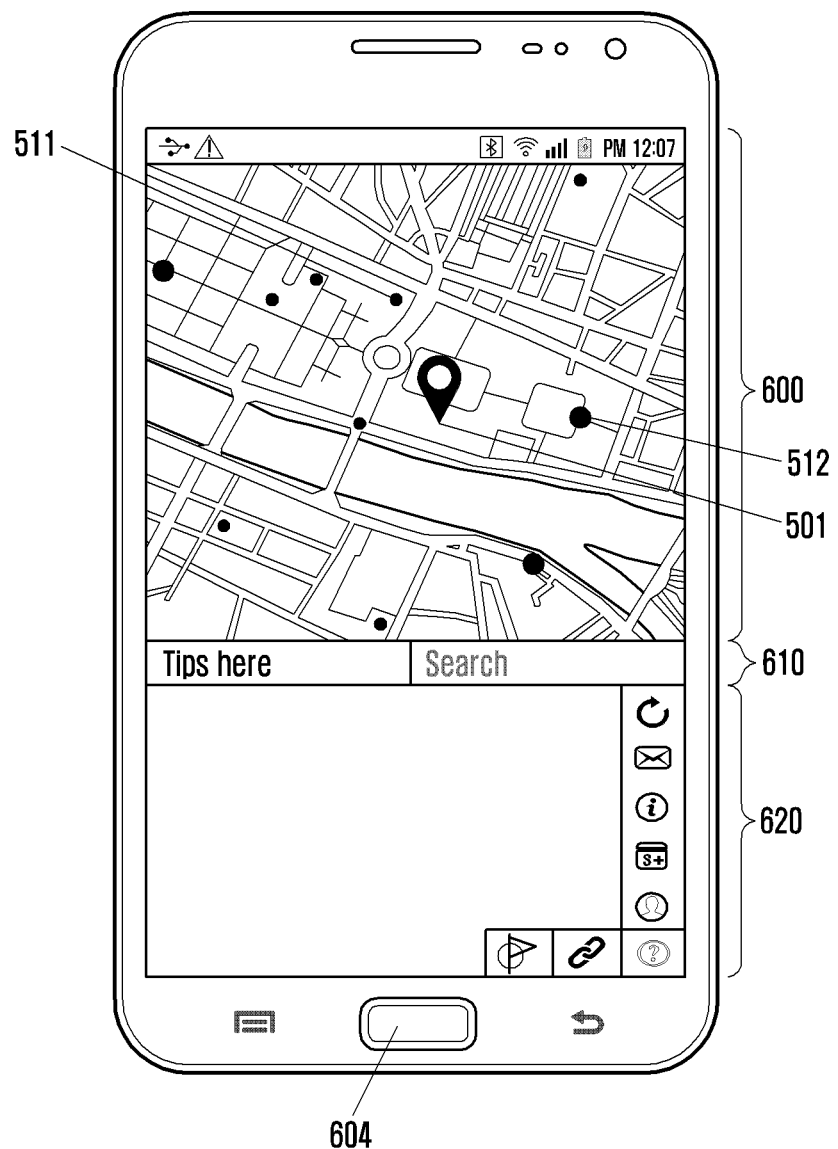
FIGS. 6A through 6G are views exemplifying user interfaces between an upload terminal and a download terminal when a posted message/content is transmitted and received according to the present disclosure.

First, referring to FIG. 6A, the display unit 143 of the terminal may be divided into a map display area 600, a search area 610 for user's search, and an input area 620 for providing various kinds of information to the user or for the user to prepare the post message/content. If the search area is selected, a part or the whole of the map area 610 or the input area 620 may be used as a prepared text display area displayed as shown in FIG. 6A to enable a user to confirm a keypad and the prepared contents for the user's search. Since this type of user interface has been widely used, no drawing or explanation will be specially added.

In the map display area 600 of FIG. 6A, the user's location, i.e., the current location of the terminal, is displayed through a point 501. Further, the map area 600 may also display a range of a distance that the user can reach within, for example, the radius of 1 km or 30 minutes' walk. The user's location information and the map information may be provided from the SNS server 200 or may be acquired based on information that is stored in the memory provided in the terminal.

Further, in the map display area 600, information on the post message/content, for example, in the form of points 511 and 512, provided from the SNS server 200 may be displayed. In this case, colors of the post message/content points 511 and 512 may be displayed on the basis of information provided from the SNS server 200 in accordance with a distance or user preference. In addition, coordinate information of the post message/content may be coordinates of a location where the upload terminal 101 that generates the corresponding post message/content. As shown, the post message/content points 511 and 512 have different sizes. In some cases, the size of the post message/content point may be larger when the corresponding post message/content is more frequently accessed by users. Such size change may be made using a field of the third additional message as described above.

Further, the points indicated in FIG. 6A exemplify a case where the post messages/content is displayed in the case where they do not match the user preference, they are not greatly related to the user, or the separate distance is larger than a predetermined value.

Figure 6B:
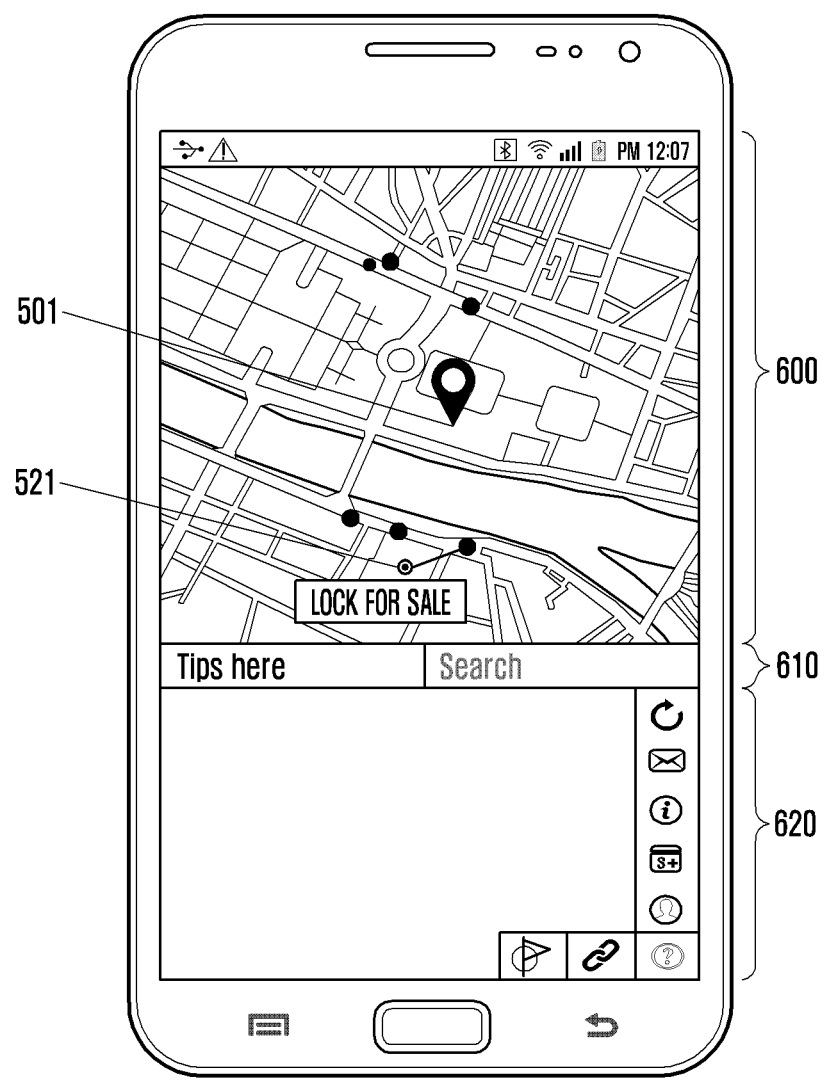

FIG. 6B exemplifies a case where commercial post messages/content are displayed through the user interface of the terminal. Referring to FIG. 6B, a map display area 600 displays a user's location, i.e., the current location of the terminal, with point 501. Further, as described above, the map area 600 may display a predetermined range of a distance around the user's location. The user's location information and the map information may be provided from the SNS server 200, or may be acquired based on information stored in a memory (e.g., the memory unit 144 of FIG. 2) provided in the terminal.

Further, in the map display area 600, information on the post message/content provided from the SNS server 200 may be displayed. FIG. 6B exemplifies a case where commercial post messages/content are displayed. Point 521 represents exemplary commercial post messages/content, and a phrase "Lock for sale" may be displayed together at a lower end of the map display area 600.

In this case, as described above, since the post message/content 521 is the commercial post message/content, a corresponding color may be given thereto. It is exemplified that the commercial post message/content is displayed with a red color. However, different colors may be used in accordance with the user's taste or the characteristics of the respective messages in the SNS server 200. Further, the coordinate information of the post message/content and phrase information that is displayed at a lower end may be data provided from the SNS server 200. Further, the size of the commercial post message/content may be fixed to have a predetermined size value, or may be adjusted in accordance with the users' evaluation or an amount charged by a user who intends to post the commercial post message/content.

Figure 6C:
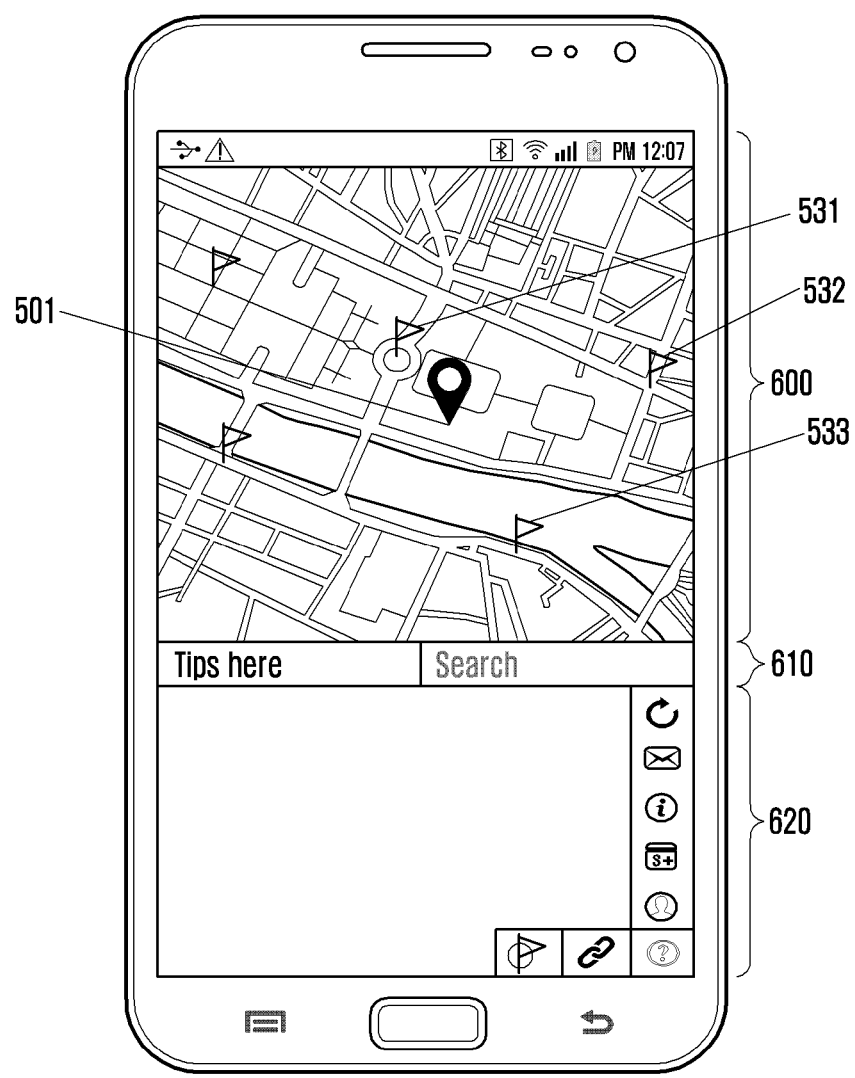

FIG. 6C exemplifies a case where post messages/content using take-and-drop messages according to an embodiment of the present disclosure. In a map display area 600 of FIG. 6C, the user's location, i.e., the current location of the terminal, is displayed in the form of point 501. Further, as described above, the map area 600 may also display a predetermined range of a distance around the user's location. The user's location information and the map information may be provided from the SNS server 200, or may be acquired based on information that is stored in the memory (e.g., the memory unit 144 of FIG. 2) provided in the terminal.

Further, in the map display area 600, information on the post messages/content provided from the SNS server 200 may be displayed. FIG. 6C exemplifies a case where post messages/content using take-and-drop messages are displayed. Flags 531, 532, and 533 exemplify post messages/content using take-and-drop messages. The post messages/content using take-and-drop messages may be used in various cases. For example, the post messages/content may be used in a case where specific users play a relay game, or give a discount to users who take the post messages using take-and-drop messages for commercially specified goods. Accordingly, if a specific user takes any one of post messages/content flags 531, 532, and 533, the taken message/content may disappear from the map display area 600. Similarly, if a user, who takes one of the post messages/content flags, drops the corresponding post message/content, a take-and-drop message may be newly generated and displayed in a location at which the take-and-drop message is dropped. The life time of the message using take-and-drop messages has been described above.

Further, different sizes and colors may be given to the post messages/content using take-and-drop messages. The post message/content may also be provided to specific users only in accordance with user preference or whether to meet the purpose of posting. For example, in the case of commercially using the post messages/content with take-and-drop messages in the vicinity of Myung-dong, Korea, it may be possible to display the post messages/content only for Japanese nationals or Chinese nationals.

Figure 6D:
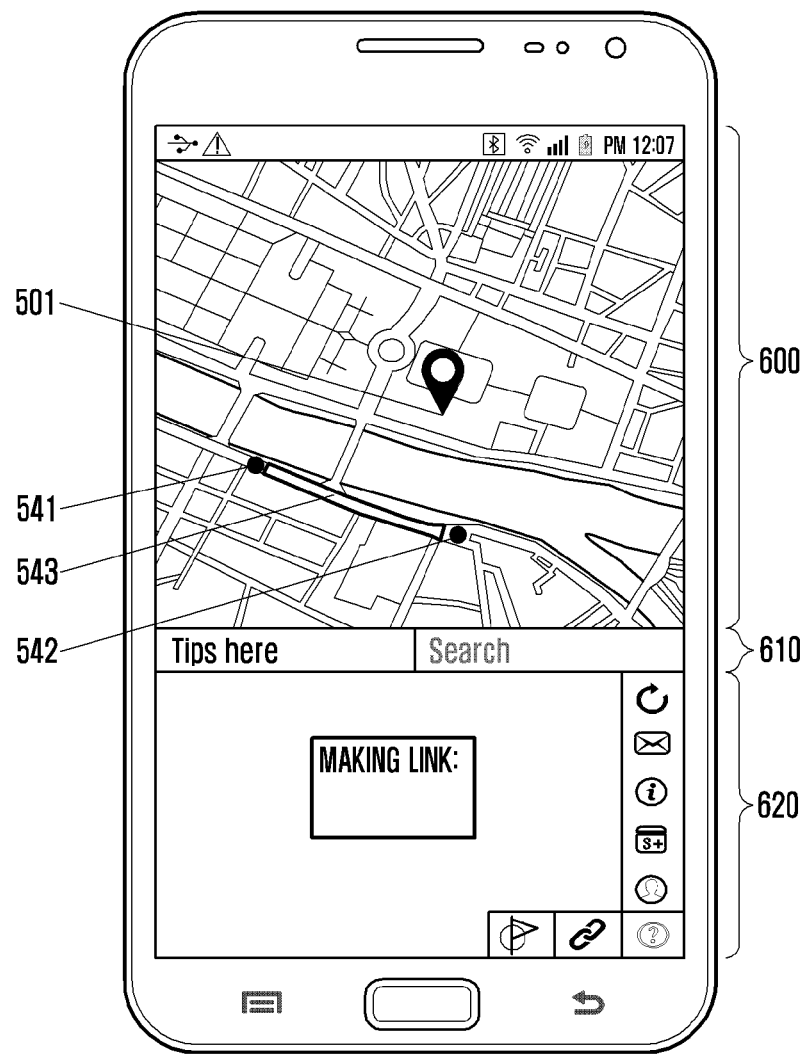

FIG. 6D exemplifies a case where a link is formed when a user of an upload terminal prepares post messages/content.

Referring to FIG. 6D, in a map display area 600 of FIG. 6D, the user's location, i.e., the current location of the terminal, is displayed through points 501. Further, as described above, the map area 600 is configured to display a predetermined range of a distance around the user's location. The user's location information and the map information may be provided from the SNS server 200, or may be acquired based on information that is stored in the memory provided in the terminal.

As described above, in a state where a map of the user's location and adjacent areas is displayed in the map display area 600, a user may select "Making LINK" and then may select a specific point through touching the location indicated by a first point 541 or inputting coordinates. Hereinafter, explanation will be made on the assumption that the input unit 142 of the terminal can provide touch, touch and drag, and the like. However, it is also possible to input specific coordinate values and to connect them to each other, and even in the case of using various kinds of external input devices, for example, a mouse and an electronic pen, an input is possible in the same or similar manner.

As described above, after selecting a first point 541, a user may select a path by dragging from the first point 541 to another specific point 532 using the input unit 142. In this case, the message/content generating module 121 of the terminal may select an optimum path 543 based on drag information from the touched point to a point at which the touch is ended. As described above, the optimum path may become one link. The path may be set in accordance with existence/nonexistence of a road or user's optional selection.

As described above, one link that is set as described above may be input as a walk, a tasty road, or a mountain trail (in the case of a mountain trail, the link may be path information that a user optionally selects regardless of existence/nonexistence of a road).

The post message/content as prepared above may be combined with the post metadata to be provided to the SNS server 200, and may be or may not be provided to other users in accordance with other users' demands, tastes, or preference.

If such link information is highly evaluated by other users, the start point of the corresponding link may have coordinates with a larger size as described above, and the life time may continuously extend.

Figure 6E:
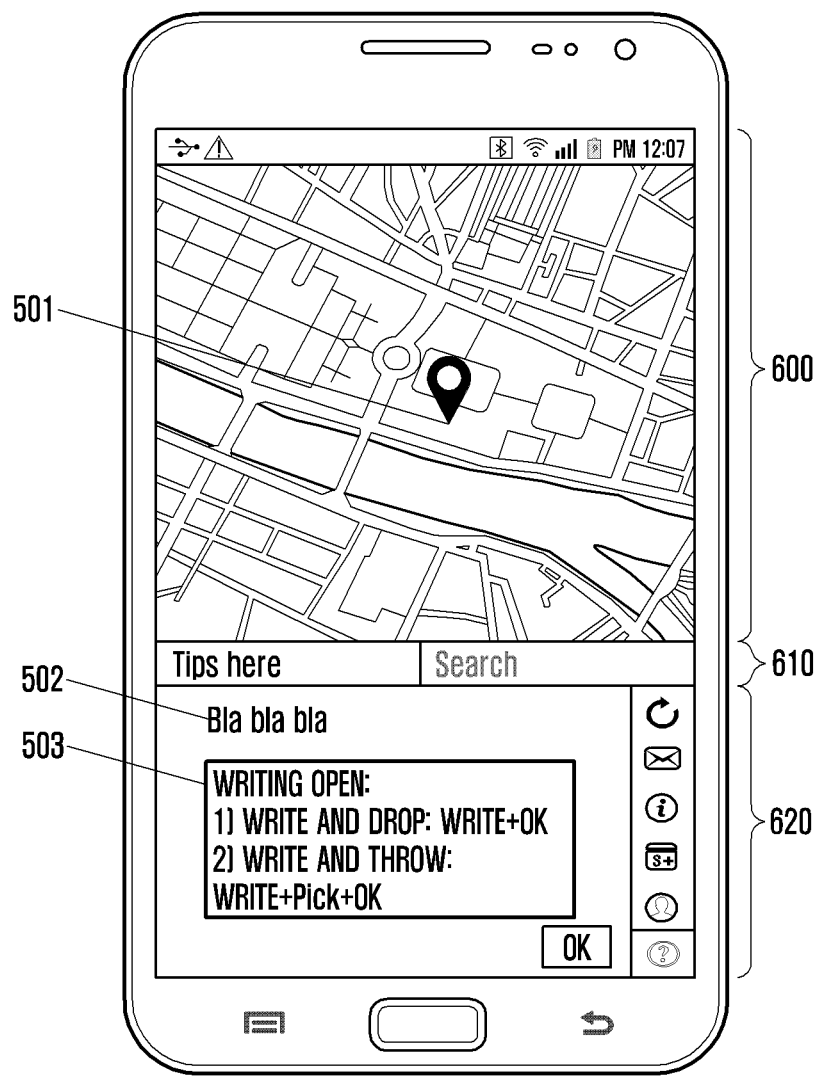

FIG. 6E exemplifies a user interface in the case where a user of an upload terminal uploads a specific message to a specific location.

Referring to FIG. 6E, in a map display area 600 of FIG. 6E, the user's location, i.e., the current location of the terminal, is displayed through a point 501. Further, as described above, the map area 600 may display a predetermined range of a distance around the user's location. The user's location information and the map information may be provided from the SNS server 200, or may be acquired based on information that is stored in the memory provided in the terminal.

Further, a user may prepare a specific text, or a photo or a moving image including text in a post message/content preparation window of an input area 620 of FIG. 6E. As exemplified in FIG. 6E, if a user inputs specific text, for example, the contents of "Bla bla bla", the corresponding input contents are displayed, and thereafter, a selection window 503 that displays selectable forms may be created.

The selection window 503 has an exemplified form as an example, and other various forms become possible. The forms exemplified in FIG. 6E may include 1) a write-and-drop form and 2) a write-and-throw form. The "write and drop" form corresponds to a case where the prepared post message/content is posted in the current location where the user is located. Accordingly, the preparation location may be the same as the post location. Accordingly, the upload terminal may generate information in which the preparation location and the post location are the same as post metadata, and may provide the generated information to the SNS server 200 together with the prepared post message/content.

Further, the "write and throw" form corresponds to a case where the current position in which a user is located and a location in which the prepared post message/content is displayed are different from each other. In this case, the user may change the map display location displayed in the map display area 620 by selecting the location information in which the post message/content is to be posted on the map, inputting specific coordinates, or performing a search through a search area, and then post the post message/content prepared as the corresponding destination through an operation of selecting a specific point.

Figure 6F:
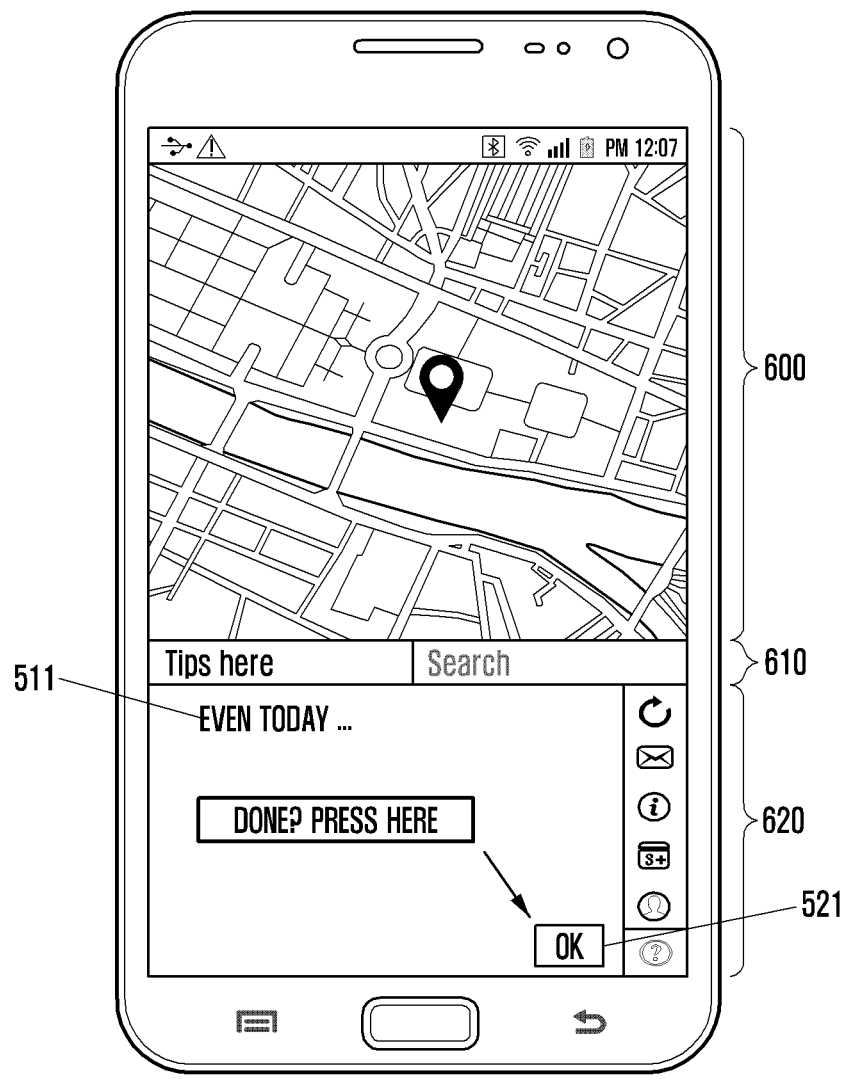

FIG. 6F exemplifies a user interface in the case where a user of an upload terminal inputs a specific message only.

Referring to FIG. 6F, in a map display area 600 of FIG. 6F, the user's location, i.e., the current location of the terminal, is displayed through a point 501. Further, a user may input a specific text in a post message/content preparation window of an input area 620 of FIG. 6F. Through such text input, a user may prepare a specific diary or memorandum for the user only, and thereafter, it may be possible to make the user display the corresponding content together with a prepared place.

As exemplified in FIG. 6F, a user may input a text or a sentence that the user intends to input, for example, contents 511 of "even today, . . . ". If the input of the text or sentence is completed as described above, the user may complete the text input by selecting a user interface 521 that notifies of completion of the text input.

Figure 6G:
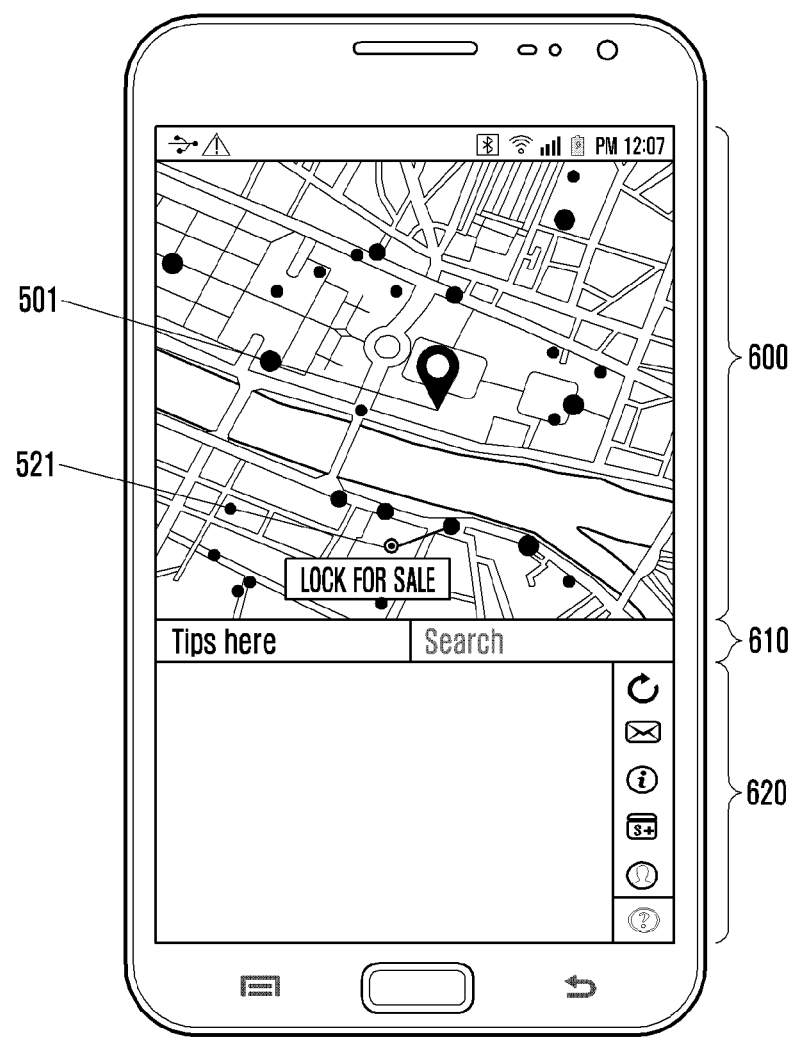

FIG. 6G exemplifies a state where various kinds of post messages/content that are generated as described above are displayed. Referring to FIG. 6G, in a map display area 600 of FIG. 6F, the user's location, i.e., the current location of the terminal, is displayed through a point 501. Further, it may be confirmed that a part of the forms as described above with reference to FIGS. 6A to 6F and other forms of post message/contents are displayed in the map display area 600 of FIG. 6G.

If a user connects to the SNS server 200, the SNS server may filter the post messages/content to be displayed to the corresponding user based on various kinds of information, such as a location of the corresponding user, pose location of the post messages/content, and user preference, and may select data to be displayed based on the filtered information to provide the selected data to the user.

Further, although only information on the user preference and nationality has been described as an example, it may be acquired based on past history information which information the user of the upload terminal or download terminal desires. For example, in the case of mainly searching for or evaluating information on a public performance of a specific signer or in the case of mainly searching for or evaluating information on the corresponding singer or a tasty road, information on the tasty road may be acquired as preference information.

It will be understood that the above-described embodiments are exemplary to help easy understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

What is claimed is:

1. An apparatus for transmitting a content of a terminal, the apparatus comprising:
   a transceiver configured to communicate with a post server;
   a user interface configured to receive a user input from a user; and
   a controller configured to:
      generate the content based on the user input received at the user interface,
      generate posting information corresponding to the content, and
      transmit the content and the posting information to the post server,
   wherein the posting information includes location information for a designated area for providing the content, and further includes at least one of preference information of the user, a type of the content, and accessibility conditions of the content.

2. The apparatus of claim 1, wherein the content comprises at least one of text, image, and moving of the image.

3. The apparatus of claim 1, wherein the designated area information includes a specific geographical point and a distance range from the specific geographical point.

4. The apparatus of claim 1, wherein the posting information includes preference of a user, wherein the preference information includes a sharing rule of the content, wherein the type of the content identifies a sponsor message, which provides a special right from a provider.

5. The apparatus of claim 1, wherein the posting information further includes information of a path route.

6. A method for receiving a content in a terminal, the method comprising:
generating a content request message based on a user input;
transmitting, to a content server, the content request message and location information of the terminal;
receiving at least one content from the content server; and
displaying at least one the content,
wherein if the received at least one content is posted on the content server with a designated area for providing of the content, and the location information is within the designated area, the at least one content is received.

7. The method of claim 6, wherein the content comprises at least one of text, image, and moving of the image.

8. The method of claim 6, wherein the designated area information includes a specific geographical point and a distance range from the specific geographical point.

9. The method of claim 6, wherein the received content further includes information of a path route.

10. An apparatus for receiving a content of a terminal, the apparatus comprising:
a transceiver configured to communicate with a post server;
a user interface configured to receive a user input from a user;
a display configured to display received content; and
a controller configured to:
generate a content request message based on a user input;
transmit, to the post server, the content request message and location information of the terminal;
receive at least one of content from the post server; and
display at least one of the content,
wherein the received at least one content includes a designated area information for providing of the content.

11. The apparatus of claim 10, wherein the content comprises at least one of text, image, and moving of the image.

12. The apparatus of claim 10, wherein the designated area information includes a specific geographical point and a distance range from the specific geographical point.

13. The apparatus of claim 10, wherein the received content further includes information of a path route.

14. A method for transmitting/receiving a content between a first terminal, a second terminal and a server, the method comprising:
receiving a content and posting information corresponding to the content from the first terminal;
storing the content and the posting information;
receiving location information of the second terminal from the second terminal;
providing content to the second terminal, and
wherein the posting information includes a location information for providing of the content, and further includes at least one of preference information of a user, a type of the content, and accessibility conditions of the content, and
wherein the location information for providing of the content includes a designated area information.

15. The method of claim 14, wherein the content comprises at least one of text, image, and moving of the image.

16. The method of claim 14, wherein the designated area information includes a specific geographical point and a distance range from the specific geographical point.

17. The method of claim 14, wherein the posting information includes preference information for the first terminal, wherein the preference information of a user includes a sharing rule of the content, and wherein the type of the content identifies a sponsor message, which provides a special right from a provider.

18. The method of claim 14, wherein the posting information further includes information of a path route.

19. The method of claim 14, wherein, when the content is stored, a life time of the content is further stored.

20. The method of claim 19, wherein the life time of the content is updated based on evaluation information, if the evaluation information of the content is received.

* * * * *